United States Patent [19]
Leumer

[11] Patent Number: 5,658,662
[45] Date of Patent: Aug. 19, 1997

[54] HIGH TENACITY, LOW FLAMMABILITY POLYESTER YARN, PRODUCTION THEREOF AND USE THEREOF

[75] Inventor: Gerhard Leumer, Bobingen, Germany

[73] Assignee: Hoechst Aktiengesellschaft, Frankfurt, Germany

[21] Appl. No.: 360,614

[22] Filed: Dec. 21, 1994

[30] Foreign Application Priority Data

Dec. 27, 1993 [DE] Germany .................. 43 44 691.4

[51] Int. Cl.$^6$ .................. D02G 3/00; B29C 47/88
[52] U.S. Cl. .................. 428/364; 428/378; 428/395; 264/211.12; 264/211.14; 264/211.22
[58] Field of Search .................. 428/364, 395, 428/921, 920; 264/211.12, 211.14, 211.22

[56] References Cited

U.S. PATENT DOCUMENTS

| | | | |
|---|---|---|---|
| 3,492,195 | 1/1970 | Spangler | 428/395 |
| 3,708,328 | 1/1973 | Kelkheim | 428/395 |
| 3,941,752 | 3/1976 | Kleiner et al. | |
| 4,033,936 | 7/1977 | Bollert et al. | |
| 4,315,847 | 2/1982 | Login et al. | 428/395 |
| 4,531,009 | 7/1985 | Inoue et al. | |
| 4,794,037 | 12/1988 | Hosoda et al. | 428/395 |
| 4,869,958 | 9/1989 | Murase et al. | 428/364 |
| 4,929,698 | 5/1990 | Hagewood | 428/395 |
| 4,933,427 | 6/1990 | Charles et al. | 428/395 |
| 4,973,657 | 11/1990 | Thaler | 428/364 |
| 5,382,474 | 1/1995 | Adhya et al. | 428/364 |
| 5,399,428 | 3/1995 | Asrar | 428/364 |
| 5,399,429 | 3/1995 | Asrar | 428/364 |

FOREIGN PATENT DOCUMENTS

| | | |
|---|---|---|
| 2019311 | 12/1990 | Canada . |
| 725535 | 1/1996 | Canada . |
| 526740A2 | 7/1992 | European Pat. Off. . |
| 1 288 734 | 2/1969 | Germany . |
| 767 204-Q | 5/1970 | Germany . |
| 513 992 | 11/1971 | Germany . |
| 23 46 787 | 9/1975 | Germany . |
| 24 54 189 | 5/1976 | Germany . |
| 1174101 | 12/1969 | United Kingdom . |

OTHER PUBLICATIONS

Chemical Abstracts, vol. 113, No. 18, Oct. 29, 1990.
Chemical Abstracts, vol. 109, No. 26, Dec. 26, 1988.

*Primary Examiner*—Jill Gray
*Attorney, Agent, or Firm*—Connolly & Hutz

[57] ABSTRACT

The present invention provides a flammability multifilament yarn comprising a polyester formed from dicarboxylic acid and diol components which contains, in the polymer chain, units of the formula I

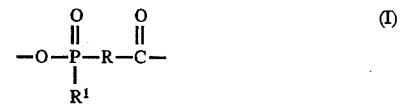

where
R is a saturated open-chain or cyclic alkylene, arylene or aralkylene radical, and
$R^1$ is an alkyl radical of up to 6 carbon atoms or an aryl or aralkyl radical,
wherein the yarn has a tenacity of at least 65 cN/tex, a total burn time, when made into a loomstate cloth and subjected to the flammability test of DIN 4102/B2, which is at least 5 times shorter than that of a comparable loomstate cloth composed of non-phosphorus-modified polyester, and wherein the yarn has no afterburning on 3 and 15 sec flaming according to DIN 54336 and 3 sec flaming according to DIN 54333.

31 Claims, 1 Drawing Sheet

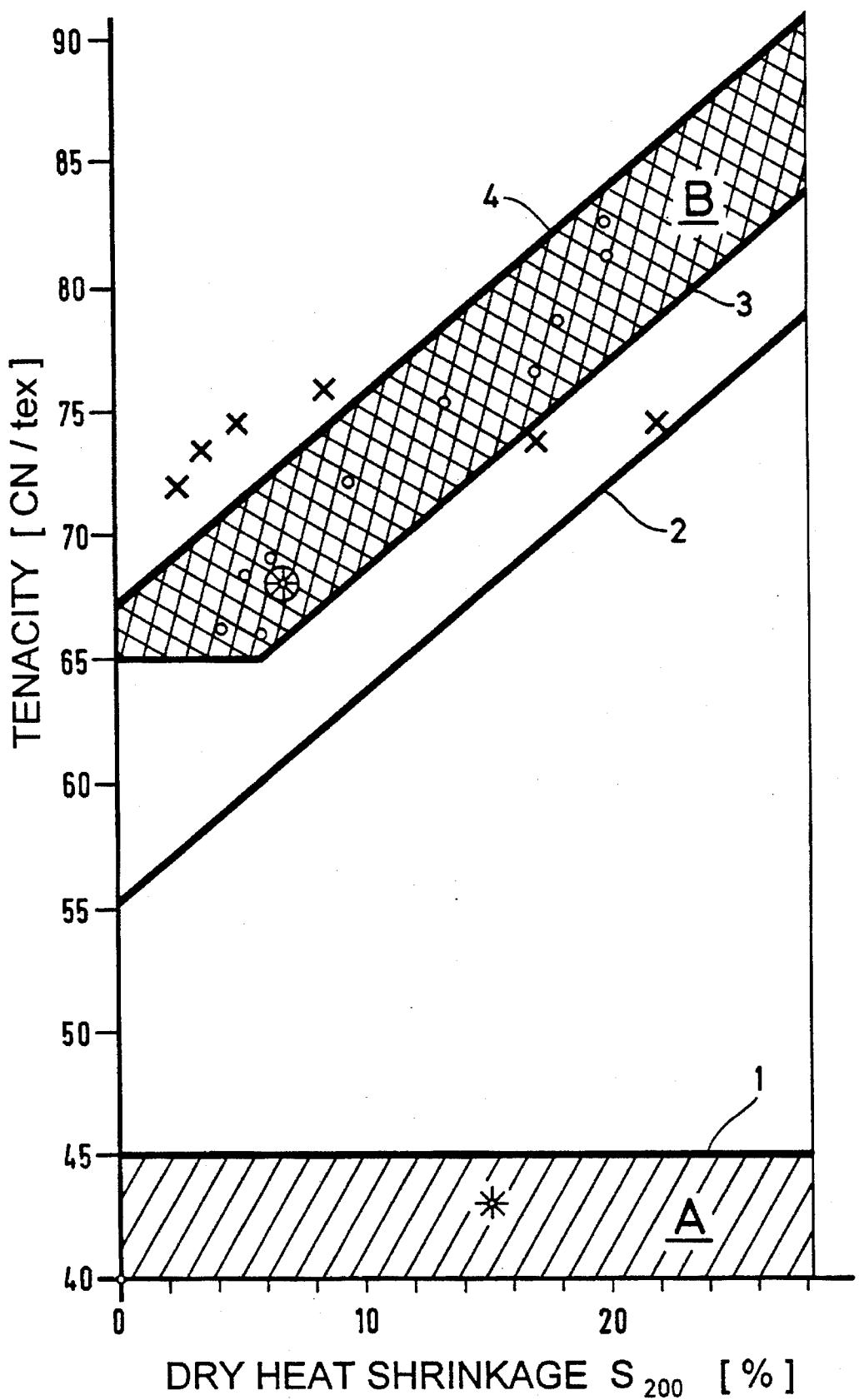

HIGH TENACITY, LOW FLAMMABILITY POLYESTER YARN, PRODUCTION THEREOF AND USE THEREOF

BACKGROUND OF THE INVENTION

1. Field of the Invention

The present invention relates to a high tenacity polyester yarn with permanent low flammability, to processes for producing it and to its use for producing industrial textile and fiber materials.

2. Summary of the Invention

To produce industrial textile and fiber materials, for example high strength tarpaulins for textile constructions (e.g. self-supporting roofs, tents, guard and building fences), linear or sheetlike reinforcing materials (strength components) for the plastics and rubber industry (e.g. tire and drive belt cords, reinforcing layers for plastics-coated tarpaulins, roofing felts or conveyor belts, geotextiles) it is necessary to have polyester fiber materials which combine a particularly high strength with other properties specified for the specific use, for example certain values of the extensibility, of the shrinkage capacity or of the modulus of elasticity.

High strength/tenacity polyester fiber materials with such combinations of properties suitable for industrial use are known, for example from GB-A-1 174 101.

Commercial types for the industrial fields mentioned, for example the high strength polyester yarn types (R)TREVIRA HIGH TENACITY, have a tenacity within the range from about 70 to 85 cN/tex combined with a breaking extension within the range from 5 to 20% and a heat shrinkage at 200° C. from about 2 to 22%.

Such high tenacity polyester yarns are generally produced by melt spinning relatively high molecular weight polyesters (IV>0.8) at relatively low spinning take-off speeds and a subsequent, generally multistaged, drawing of the spun filaments to the required strength and breaking extension, optionally with application of a producer twist or twisting and a final heat-setting to stabilize the overall combination of properties. This conventional method of producing industrial polyester yarns is described for example in DE-C-12 88 734 (Chantry/Molini). More recent processes, for example the process described in EP-A-0 526 740 (Hoechst AG) for producing industrial polyester yarns, employ significantly higher spinning speeds and lower draw ratios.

Compared with industrial polyester yarns, polyester yarns for textile purposes have a distinctly lower strength level. The breaking strength of textile filaments ranges from about 30 to 50 cN/tex, and specific requirements, for example particularly low pilling, preferably requires types at the lower end of the strength range, in particular those having a particularly low transverse strength.

A requirement of polyester yarns and fabrics which was initially only demanded in the textile sector is low flammability.

To meet these requirements, it is known to provide the produced textile materials with flameproofing finishes. However, various auxiliaries used for this purpose are presently only on the surface of the textiles and are therefore relatively easy to remove, so that for example washing severely impairs the flameproofness.

A dramatic improvement in the flame resistance of polyester fiber materials was obtained by using polyester raw materials in their production which contained units in the chain of the polyester molecule which render the polyester itself low flammable.

Yarns made of such polyesters have a wash-resistant (permanent) low flammability.

Such modified low flammability polyester raw materials and fiber materials therefrom are known from German patents 2,346,787 and 2,454,189. The low flammability threads described there have a breaking strength of about 33 cN/tex and a breaking extension of 35% and consequently correspond to customary yarns for the textile sector. They are recommended in particular for the production of low flammability furnishings, carpets, curtains and the like.

A commercially available low flammability polyester filament yarn is for example (R)TREVIRA CS from Hoechst AG, which has a tenacity of up to about 45 cN/tex, which is relatively high for textile purposes, a breaking extension of about 30% and a dry heat shrinkage of about 20% at 200° C.

As safety awareness increases, the demand for low flammability polyester fiber materials is increasingly also being voiced for the industrial sector. However, the experience of the last 20 years has shown that the chemical modification as known from the abovementioned references and for the production of textile polyester fiber materials (multifilament and staple fiber yarns and woven, knitted or nonwoven fabrics fabricated therefrom) has hitherto not been successful in the production of industrial fiber materials. This is because applying the processes for producing high tenacity industrial polyester yarns to the polyester raw materials known from the cited patent specifications does not produce the desired success but instead leads to appreciable losses especially in the tenacity.

It is also known to render polyesters low flammable by condensing halogen-containing units into the polyester chain.

According to EP-B-0 099 933, page 8, lines 60 ff, it is said to be possible to produce polyesters with a high modulus of elasticity (Young's modulus) which can be used as industrial reinforcing yarns in motor vehicle tires, conveyor belts and drive belts if α-ω-bis(2-chlorophenoxy)alkane-4,4'-dicarboxylic acids are used as dicarboxylic acid component in making the polyester. The yarn thus produced, however, naturally has the disadvantage common to all halogen-modified polyesters that thermal stress, for example the heat from the burning surroundings in the event of a fire, will cause it to eliminate appreciable quantities of hydrogen halide, which can lead to serious secondary consequences for property and persons.

So low flammability halogen-free polyester yarns were hitherto unavailable for typical industrial applications in which certain property profiles involving a high tenacity are required.

For some applications of industrial polyester yarns for which low flammability is required the only choice was therefore to finish the fiber materials subsequently with flameproofing agents with their abovementioned disadvantages, especially the only moderate washing, cleaning and weather resistance of the flameproofing effect.

SUMMARY OF THE INVENTION

It has now been found, surprisingly, that contrary to the experience to date, it is nevertheless possible to use the phosphorus-modified, low flammability polyester raw materials of German patents 2,346,787 and 2,454,189 to produce low flammability fiber materials having the property profile characteristic of industrial fiber products, especially a sufficient tenacity for use in industry.

The present invention accordingly provides a low flammability multifilament yarn, especially for use in industry, composed of a polyester formed from dicarboxylic acid and diol components which contains, in the polymer chain, units of the formula I

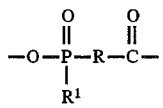

where

R is a saturated open-chain or cyclic alkylene, arylene or aralkylene radical, and $R^1$ is an alkyl radical of up to 6 carbon atoms or an aryl or aralkyl radical, characterized by a tenacity (F) of at least 65 cN/tex, a total burn time, when made into a loomstate cloth and subjected to the flammability test of DIN 4102/B2, which is at least 5, preferably 10, times shorter than that of a comparable loomstate cloth composed of non-phosphorus-modified polyester, and by the absence of afterburning on 3 and 15 sec flaming according to DIN 54336 and 3 sec flaming according to DIN 54333.

DESCRIPTION OF THE PREFERRED EMBODIMENT

The present invention provides a flammability multifilament yarn comprising a polyester formed from dicarboxylic acid and diol components which contains, in the polymer chain, units of the formula I

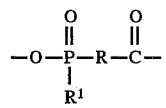

where

R is a saturated open-chain or cyclic alkylene, arylene or aralkylene radical, and $R^1$ is an alkyl radical of up to 6 carbon atoms or an aryl or aralkyl radical wherein the yarn has a tenacity of at least 65 cN/tex, a total burn time, when made into a loomstate cloth and subjected to the flammability test of DIN 4102/B2, which is at least 5 times shorter than that of a comparable loomstate cloth composed of non-phosphorus-modified polyester, and wherein the yarn has no afterburning on 3 and 15 sec flaming according to DIN 54336 and 3 sec flaming according to DIN 54333.

The yarns of the present invention thus have a tenacity which is at the level of known high tenacity yarns for use in industry and are at the same time of very low flammability.

The flammability comparison is advantageously carried out using a comparative loomstate cloth produced from normal, i.e. non-phosphorus-modified, polyester yarn and otherwise has the same construction data (e.g. basis weight, yarn linear density, type of weave) as the in-test fabric.

Under these conditions, the test fabric produced from yarn of the present invention has a total burn time which is at least 5 times shorter than that of the comparative fabric, i.e. which is only at most ⅕ of the total burn time of the comparative fabric.

From previous experience, it is very surprising for one skilled in the art that it has been possible to bring about this combination of useful properties in a polyester yarn made of a polyester which has been phosphorus-modified through incorporation of units of the formula I.

Preferred low flammability multifilament yarns of the present invention contain phosphorus-containing units of the formula I in which the radicals R and $R^1$ are each as defined in detail in German patents Nos. 2,346,787 and 2,454,189. Halogen-free radicals R and $R^1$ are preferred.

More particularly, in preferred low flammability multifilament yarns of the present invention, R is open-chain alkanediyl having from 1 to 15, preferably 2 to 10, carbon atoms, cyclic alkanediyl having from 4 to 8, preferably 6, carbon atoms, arylene having from 6 to 18, preferably from 6 to 12, carbon atoms or aralkyl having from 7 to 13, preferably from 7 to 11, carbon atoms, in each case with one to three, preferably with one or two fused or unfused nuclei, and $R^1$ is alkyl having from 1 to 6, preferably from 1 to 4, carbon atoms, arylene having from 6 to 12, preferably from 6 to 10, carbon atoms or aralkyl having from 7 to 13, preferably from 7 to 11, carbon atoms, in each case with one or two fused or unfused nuclei.

The radicals R and $R^1$ can carry one or more, preferably one or two, single-bond substituents. Open-chain alkanediyl or alkyl can be substituted by alkoxy groups having 1–6 carbon atoms, preferably by methoxy or ethoxy groups; cyclic alkyl groups and the aromatic nuclei of the aryl and aralkyl groups can carry alkyl groups having from 1 to 6 carbon atoms, preferably 1 or 2 carbon atoms, alkoxy groups having from 1 to 6 carbon atoms, preferably 1 or 2 carbon atoms, or sulfonic acid or sulfonate groups. In polynuclear aryl groups, the nuclei can be fused or they can be bonded together directly or via bridge members. Similarly, in araliphatic radicals R and $R^1$, the aromatic rings and the aliphatic members can be bonded together directly or via bridge members.

Suitable bridge members include in particular —O—, —S— and —$SO_2$—.

Very particular preference is given to low flammability multifilament yarns composed of polyesters with units of the formula I where $R^1$ is alkanediyl having from 2 to 6 carbon atoms, cyclcoalklanediyl having 6 carbon atoms, methylenephenyl or phenylene, in particular ethylene, and $R^2$ is alkyl having from 1 to 6 carbon atoms, or aryl or aralkyl having from 6 to 7 carbon atoms, especially methyl, ethyl, phenyl or benzyl.

Depending on the intended use, the yarns of the present invention can be equipped with a combination of particularly useful properties.

A preferred group of yarns according to the present invention has a tenacity of above 65 cN/tex and a dry heat shrinkage $S_{200}$ of below 7.5%.

A further preferred group of yarns according to the present invention has a tenacity of above 70 cN/tex and a dry heat shrinkage $S_{200}$ of below 15%.

Preference is further given to yarns according to the present invention which have a tenacity of above 75 cN/tex and a dry heat shrinkage $S_{200}$ of above 15%.

Particular preference is given to yarns according to the present invention for which the relationship between the tenacity F (in cN/tex) of the yarn and its dry heat shrinkage $S_{200}$ (in %) is given by the equation (1):

$$F = K + 0.954 * S_{200} \tag{1}$$

where the summand K is above 55, preferably from 60 to 67, and $S_{200}$ is from 2 to 25, preferably from 4 to 22.

The figure illustrates in a tenacity/dry heat shrinkage diagram the regions occupied by prior art textile low flammability multifilament yarns and by the high tenacity, low flammability multifilament yarns of the present invention which are suitable for various industrial (technical) applications, and by the prior art industrial high tenacity yarns of normal flammability. The hitherto customary textile low flammability fiber materials are disposed in the hatched region A underneath the limit of 45 cN/tex (straight line 1).

The multifilament yarns of the present invention are preferably disposed in the region above curve 2, in particular in the crosshatched region B enclosed between curves 3 and 4. The asterisk (*) indicates the position of the known, commercially available low flammability polyester fiber material in this diagram, while the x symbols characterize the position of known high tenacity but normal flammability polyester fiber materials and the small circles (o) characterize the position of high tenacity and low flammability polyester fiber materials according to the present invention. The encircled asterisk characterizes the position of a commercially available high tenacity but flammable polyester yarn ((R)TREVIRA 716) in this diagram.

The dry heat shrinkage of the multifilament yarns according to the present invention at 200° C. is preferably within the range from 5 to 20%, and the breaking extension within the range from 5 to 30%, preferably within the range from 7.5 to 26%, an extension at 54 cN/tex loading of from 4 to 25%, preferably from 5 to 23%, and a breaking energy index $A_R$=F·E/2 of from 300 to 900 [%·cN/tex].

The hot air shrinkage at 200° C. ($S_{200}$) is determined in accordance with DIN 53866 Part 3.

The polyesters of the low flammability multifilament yarns of the present invention, which contain units of the formula I, are otherwise composed of the units customary in known fiber-forming polyesters, namely those which are derived from dicarboxylic acid, preferably from aromatic dicarboxylic acids, and from aliphatic diols.

Widely used aromatic dicarboxylic acid units include the bivalent radicals of benzenedicarboxylic acids, in particular of terephthalic acid and of isophthalic acid; widely used diols have 2–4 carbon atoms, and ethylene glycol is particularly suitable. Preferably the polyesters contain more than 80 mol %, in particular more than 90 mol %, of ethylene terephthalate units. The remaining 20 or 10 mol % are then made up of units of the formula I and of dicarboxylic acid units and diol units which act as modifiers and which make it possible for one skilled in the art to exert specific influence over the physical and chemical products of the filament products. Examples of such dicarboxylic acid units include radicals of aromatic or araliphatic dicarboxylic acids with one or more, preferably one or two, fused or unfused aromatic nuclei, for example of isophthalic acid, 5-sulfoisophthalic acid, 5-sulfopropoxyisophthalic acid, 2,6-naphthalenedicarboxylic acid, 4,4'-biphenyldicarboxylic acid, p-phenyleneacetic acid, 4,4'-oxydibenzoic acid or diphenoxyalkanedicarboxylic acid, or radicals of cyclic or acyclic aliphatic dicarboxylic acids, for example trans-hexahydroterephthalic acid, 1,2-cyclobutanedicarboxylic acid, glutaric acid, adipic acid, sebacic acid; examples of modifying diol radicals are those of branched and/or long-chain diols having from 3 to 10, preferably from 3 to 6, carbon atoms, e.g. of 1,3-propanediol, 1,4-butanediol, 1,6-hexanediol, 2,2-dimethylpropanediol or 2-ethyl-1,6-hexandiol, or of cyclic diols, for example of 1,4-hydroxymethylcyclohexane, or of diols which contain ether groups, for example or di- or triethylene glycol, or, if present in a small amount, of polyglycol having a molecular weight of about 500–2000.

Preference is specifically given to low flammability multifilament yarns wherein the polymer chains of the polyesters, based on the sum of all their dicarboxylic acid and diol units, contain from 0.5 to 14, preferably from 1.0 to 10 mol % of units of the above-indicated formula I, from 40 to 49.75 mol %, preferably from 43.5 to 49.5 mol %, of units of the formula II

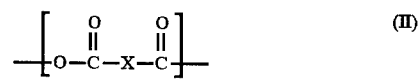

from 6 to 0 mol %, preferably from 3 to 0 mol %, of units of the formula III

and from 40 to 49.75 mol %, preferably from 43.5 to 49.5 mol %, of groups of the formula IV

where

X comprises at least 80 mol % (based on the totality of the radicals X=100 mol %) of monocyclic or bicyclic aromatic radicals having from 6 to 12 carbon atoms, preferably phenylene radicals, in particular 1,4-phenylene radicals, and not more than 20 mol % of monocyclic or polycyclic aromatic radicals having 5 to 16, preferably from 6 to 18, carbon atoms, araliphatic radicals having one or two aromatic nuclei and from 1 to 6 carbon atoms in the aliphatic structural elements, or aliphatic radicals having from 4 to 10 carbon atoms, preferably from 6 to 8 carbon atoms, $X^1$ denotes monocyclic or polycyclic aromatic radicals having from 5 to 16, preferably from 6 to 12, carbon atoms, araliphatic radicals having one or two aromatic nuclei and from 1 to 6 carbon atoms in the aliphatic structural elements, or aliphatic radicals having from 4 to 10 carbon atoms, preferably from 6 to 8 carbon atoms, Y comprises at least 80 mol % (based on the totality of the radicals Y=100 mol %) of alkylene or polymethylene groups having from 2 to 4 carbon atoms or cycloalkane or bismethylenecycloalkane groups having 6 to 10 carbon atoms and not more than 20 mol % of straight-chain or branched alkanediyl having from 5 to 16, preferably from 5 to 8, carbon atoms, cycloalkane or bismethylenecycloalkane groups having from 6 to 10 carbon atoms or radicals of the formula —$(CH_2CHR^3-O)_n$—$CH_2CHR^3$—, where $R^3$ is methyl or hydrogen and n is an integer from 1 to 40, n=1 or 2 being preferred for proportions up to 15 mol % and groups having n=10 to 40 preferably being present only in proportions of below 5 mol %.

Monocyclic or bicyclic aromatic radicals X having from 6 to 12 carbon atoms include for preference phenylene, especially 1,4-phenylene, naphthylene, especially 2,6-naphthylene, and biphenylene, especially 4,4'-biphenylene.

In polyesters which contain units of the formula III, $X^1$ is preferably m-phenylene or in particular p-phenylene.

Particular preference is given to low flammability multifilament yarns made of polyester which does not contain any units of the formula III and in which from 90 to 100 mol %, preferably from 95 to 100 mol %, of the radicals X are p-phenylene and from 0 to 10 mol %, preferably from 0 to 5 mol %, of the radicals X are m-phenylene, 5-sulpho-1,3- phenylene; 5-sulfopropoxy-1,3-phenylene; 2,6-naphthylene; 4,4'-biphenylene; 1,4-bismethylenephenyl, 1,4-cyclohexanediyl, 1,2-cyclobutanediyl, 1,4-n-butanediyl, 1,5-n-pentanediyl, 1,6-n-hexanediyl or radicals of the formula V

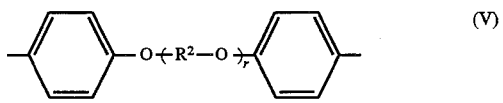

where $R^2$ is straight-chain or branched alkanediyl having from 2 to 6 carbon atoms and r is 0 or 1.

Particular preference is also given to low flammability multifilament yarns composed of polyesters comprising units of the formulae I, II and IV where X (based on the totality of all radicals X=100 mol %) comprises from 85 to 98 mol % of p-phenylene, from 2 to 15 mol % of m-phenylene and from 0 to 5 mol % of aliphatic radicals.

Particular preference is also given to low flammability multifilament yarns composed of polyesters where from 80 to 100 mol % of the Y radicals are ethylene radicals, from 0 to 20 mol % of the Y radicals are 1,4-bismethylenecyclohexane and/or 2,2-dimethylpropane-1,3-diyl radicals, and from 0 to 3 mol % of the Y radicals are long-chain diol radicals.

Particular preference is further given to low flammability multifilament yarns composed of polyesters whose chain contains at least 90 mol % of ethylene terephthalate groups.

Advantageously, the polyesters of the low flammability multifilament yarns of the present invention have a specific viscosity from 0.8 to 1.7, preferably from 1.1 to 1.5, measured in a 1% strength by weight solution of the polyester in dichloroacetic acid at 25° C.

The aromatic radicals X can all be identical within the scope of the definition, or they can be different.

More particularly, the abovementioned units represented by X, which may account for at least 80 mol % of all X radicals, can be present in the polyester chain individually or mixed. It is preferred for the at least 80 mol % of the X radicals to be formed by only one or two species, especially one species, from the group of the radicals specified for these main components.

A possibly desired further modification of the polyester chain is then preferably effected with other structural units within the scope of the definition given for the not more than 20 mol % of structural units represented by X.

For instance, the at least 80 mol % of aromatic radicals X can for example all be 1,4-phenylene radicals, or they can be made up for example in a molar ratio from 4:6 to 6:4 of 2,6-naphthylene radicals and 4,4'-biphenyldiyl radicals.

Preference is given to polyesters in which at least 95 mol % of the X radicals are aromatic radicals and not more than 5 mol % are aliphatic radicals, but in particular to those in which X denotes aromatic radicals exclusively.

Similarly, the Y radicals can all be identical within the scope of the definition given, or they can be different.

More particularly, the abovementioned structural units Y, which account for at least 80 mol % of all Y radicals, can be present in the polyester chain individually or mixed.

It is preferably for the at least 80 mol % of the Y radicals to be formed by only one or two species, in particular one species, from a group of the radicals specified for these main components.

A possible desired modification of the polyester chain is then preferably effected by other structural units within the scope of the definition given for the not more than 20 mol % of structural units represented by Y.

For instance, the at least 80 mol % of aliphatic Y radicals can all be for example ethylene radicals, or can be made up for example in a molar ratio from 10:1 to 1:10 of ethylene and 1,4-dimethylenecylcohexane radicals.

Particular preference is given to polyesters in which at least 95 mol % of the Y radicals are ethylene radicals.

Examples of suitable aromatic radicals X include 1,4- and 1,3-phenylene. Further examples of such aromatic radicals are:

1,4-, 1,5-, 1,8-, 2,6- and 2,7-naphthylene, 4,4'-biphenylene, furylene and radicals of the formula VI

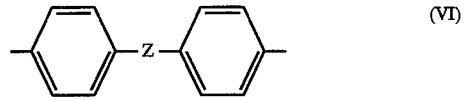

where Z is polymethylene or alkylene having from 1 to 4 carbon atoms, $—SO_2—$, $—COO—$, $—O—$ or $—S—$.

The aromatic radicals X and $X^1$ may in turn additionally carry one or two substituents. In this case it is preferable, however, for only a proportion of up to 15%, in particular of up to 7%, of the aromatic radicals present to be substituted. Preferably the substituted aromatic radicals each carry only one substituent. Suitable substituents include for example alkyl having 1 to 4 carbon atoms, alkoxy having from 1 to 4 carbon atoms, chlorine, and sulfo, although the halogen substitution is less preferable.

Radicals derived from aliphatic dicarboxylic acids and aromatic radicals yielding angled chains, for example isophthalic acid radicals, or containing the bulkier aromatic nuclei, such as the naphthalene nucleus, and also the longer-chain structural units Y are incorporated into the polyester chain in particular if it is desired to modify the properties of the polyester.

A further example of a low flammability multifilament yarn is such a yarn which is composed of a polyester whose chain comprises units of the formula I, ethylene terephthalate units and up to 10 mol % of other units from the abovementioned groups and has been modified so that certain performance characteristics are obtained, for example a polyethylene terephthalate modified through incorporation of the radicals I which, through incorporation of sulfo-containing units (e.g. sulfo-isophthalic acid), has had an affinity for basic dyes conferred upon it.

The present invention further provides a process for producing the above-described multifilament yarns of the present invention. In this process, a polyester meeting the above-indicated definitions is conventionally spun from the melt by melting, melt filtration and extrusion and the spun filaments are cooled down by quenching with air and taken off at a spinning take-off speed of preferably above 300 m/min, in particular at a spinning take-off speed of from 500 to 1500 m/min.

Preferably the production of the multifilament yarn according to the present invention is carried out batchwise. In this preferred embodiment, the spun filaments are wound up or laid down, for example in the form of tows in cans, and then, preferably at a speed of above 150 m/min, drawn in at least two stages batchwise, the pre-draw, which accounts for from 50 to 70% of the total draw, being carried out at a temperature between 70° and 85° C., preferably between 75° and 80° C., and the second drawing stage, which is carried out at a temperature of from 215° to 235° C., preferably from 220° to 230° C., being used to set a total draw ratio of from 1:4.5 to 1:6.

Alternatively, the production of the multifilament yarns according to the present invention can also be carried out in a continuous spin-draw process.

Finally, the drawn filaments are optionally additionally subjected, for the purpose of setting the desired breaking extension and the required heat shrinkage, to a setting and relaxing treatment at temperatures from 225° to 240° C., preferably from 230° to 235° C., using a shrinkage ratio of from 1:1 to 1:0.8 preferably from 1:0.995 to 1:0.82.

Preferably, in the process of the present invention, the first drawing stage is used to set a draw ratio within the range from 1:2.4 to 1:3.9.

Preferably, in the event of a change in the spinning speed, the draw ratio is adapted to the orientation which will have changed as a result. For this, the draw ratio of the first drawing stage is preferably set in such a way as to produce, based on the as-spun linear density, a drawing tension from 0.7 to 1.2 cN/tex, in particular from 0.8 to 1.0 cN/tex, and in the second drawing stage a drawing tension from 3.5 to 5.4 cN/tex, in particular from 3.9 to 5.0 cN/tex.

It is of particular importance that the combination of low flammability with a high tenacity and a broad, process-adjustable spectrum of the thermal shrinkage is only obtained in the multifilament yarns of the present invention when the drawing and setting temperature is at no time higher than that stated above. Higher drawing and setting temperatures lead to an appreciable decrease in the tenacity.

In contradistinction to the teaching of DE-C-23 46 787 and DE-C-24 54 189, the yarns of the present invention do not correspond in the totality of their properties (e.g. strength, heat shrinkage and breaking extension) to the unmodified yarns, but on the contrary show a new, unique profile which, by virtue of its scope for variation, can be excellently adapted to many industrial purposes and therefore has particular advantages.

The stated process conditions make it possible for example to produce yarns having flame resistant properties which, in terms of tenacity, breaking extension and modulus of elasticity, are comparable to the high tenacity yarns made of unmodified polyesters (see for example Examples 3 and 4 in comparison with 12 and 13) and can therefore be used to equal effect in the corresponding fields of use.

The process alternatively also makes it possible to produce low flammability yarns having a low shrinkage level, as required for example for producing industrial fabrics (see Examples 1 and 2 compared with 11 and 12). It is particularly advantageous in this connection for the yarns of the present invention to have a higher breaking energy (for example characterized by the above-indicated and -defined breaking energy coefficient), specifically because of a higher elongation, which is generally considered advantageous in the production of sheetlike structures.

The process of the present invention, if desired, also permits the specific production of low flammability yarns having a high thermal shrinkage, which cannot be produced with unmodified polyethylene terephthalate in a two-stage spin-draw process. Yarns having such high shrinkage values and a low breaking extension, which are preferred for producing belts, have hitherto been obtainable from unmodified polyethylene terephthalate only in a single-stage spin-draw process. Compared with these single-stagely produced high-shrinkage known yarns, the yarns of the present invention have a distinctly higher strength (cf. Examples 5-8 with 15 and 16). Surprisingly, these yarns can even be obtained without a setting step (Examples 5-7).

The process of the present invention also permits the production of low flammability yarns having relatively fine linear densities and a high tenacity, as desired for example for producing tent fabrics (Examples 9 and 10).

Particular preference is given to those low flammability multifilament yarns of the present invention and to those embodiments of the production process of the present invention which include a combination of a plurality of preferred features.

As observed earlier, the properties of the low flammability multifilament yarns of the present invention can be varied within relatively wide limits (within the scope of the above-specified limits) by varying the production conditions. Owing to this broad palette of application-relevant property combinations, the yarns of the present invention can be employed for a wide range of uses in industry.

Of considerable interest for use in industry is the use of the low flammability multifilament yarns of the present invention for producing high strength, low flammable building textiles, for example tarpaulins, safety fences, building fences, weather protection facilities and the like.

A further interesting application is the use of the low flammability multifilament yarns of the present invention for producing tents, for which in particular the fine linear density types are used with advantage.

The low flammability multifilament yarns of the present invention can further be used for producing conveyor belts, in which case they are chiefly used in the warp, with the weft comprising monofilaments which confer the necessary transverse stiffness on the belt. Advantageously, the monofilaments used in this case are likewise low flammable, for example those described in EP-A-0403 969.

The low flammability multifilament yarns of the present invention can also be used with particular advantage for producing flame resistant coating substrates, for example in the fabrication of fabrics coated to be flame resistant. By using the low flammability yarns in the substrate it may in certain circumstances be possible to reduce the proportion of flame retardant constituents in the coating composition.

A further application is the use of the low flammability multifilament yarns of the present invention as strength component in rubber products, for example in conveyor belts, V belts, motor vehicle tires and the like.

The Examples which follow illustrate the production and the properties of low flammability multifilament yarns according to the present invention.

EXAMPLE 1

Chips of a poly(ethylene terephthalate) containing 3% by weight of units of the formula I where R is ethyl and $R^1$ is methyl and having a specific viscosity of 1.376, measured in a 1% strength by weight solution in dichloroacetic acid at 25° C., and a carboxy group content of 17.0 mmol/kg are melted at 280° C. and fed via gear spinning pumps via a spin pack with sand and wire mesh filter to a spinneret with 200 orifices. The temperature of the melt is 287° C.

The filaments emerging from the spinneret are cooled down by a transverse quench with 30° C. air, coalesced, spin-finished, and taken off and wound up at a speed of 740 m/min.

The as-spun linear density of the multifilament yarns thus obtained was 5,400 dtex, the specific viscosity of the filament material, determined as indicated above, was 1.172.

The multifilament yarns thus produced were then directly subsequently multistagedly drawn, the first stage being carried out at 80° C. and the second stage at 230° C. The draw ratio was set in the first stage to 1:3.19 and in the second stage to 1:1.75 (total draw: 1:5.58). The speed of the take-off rolls of the second drawing stage was 160 m/min.

The drawn yarns were then additionally heat-set at 230° C. while allowing a small amount of shrinkage (1:0.844).

The multifilament yarn produced had the following properties:

Linear density: 1,126 dtex

Tenacity: 66.3 cN/tex

Breaking extension: 25.4%

Extension at 54 cN/tex: 22.5

Hot air shrinkage at 200° C. ($S_{200}$): 4.3%

Breaking energy index as defined above: 842%·cN/tex

Specific viscosity of fiber material (measured as indicated above): 1.10.

EXAMPLES 2 TO 10

Example 1 was repeated under varied conditions to produce multifilament yarns according to the present invention from the same modified poly(ethylene terephthalate) chips as used in Example 1.

The production conditions and the properties of the ready-drawn and heat-set multifilament yarns according to the present invention are indicated in the table below. The breaking energy index $A_R$ is, as already indicated above, defined as $$A_R = F \cdot E/2$$

EXAMPLES 11 TO 14

Examples 11 to 14 indicated in Table 2 illustrate the production and the properties of multifilament yarns composed of unmodified polyethylene terephthalate which were obtained under the stated, comparable production conditions.

Examples 15 and 16 of Table 2 show the properties of two commercial high tenacity polyethylene terephthalate yarns produced by known spin-draw processes.

TABLE 1

| Conditions/feature | Examples according to the invention | | | | | | | | |
|---|---|---|---|---|---|---|---|---|---|
| | Example 2 | Example 3 | Example 4 | Example 5 | Example 6 | Example 7 | Example 8 | Example 9 | Example 10 |
| Spinning | | | | | | | | | |
| % by weight of compound of formula I in polyester | 3 | 3 | 3 | 3 | 3 | 3 | 3 | 3 | 3 |
| Specific viscosity of chips | 1.287 | 1.278 | 1.287 | 1.287 | 1.287 | 1.287 | 1.287 | 1.376 | 1.287 |
| Temperature of melt [°C.] | 284 | 285 | 285 | 285 | 285 | 285 | 285 | 287 | 272 |
| Spinning take-off speed [m/min] | 740 | 740 | 740 | 740 | 740 | 740 | 740 | 740 | 740 |
| Drawing | | | | | | | | | |
| Temperature of stage 1 [°C.] | 80 | 80 | 80 | 80 | 80 | 80 | 80 | 80 | 80 |
| Draw ratio of stage 1 | 3.85 | 3.25 | 3.25 | 3.25 | 3.25 | 3.25 | 3.25 | 3.3 | 2.57 |
| Temperature of stage 2 | 225 | 220 | 230 | 230 | 230 | 220 | 220 | 220 | 230 |
| Total draw ratio | 5.63 | 5.86 | 5.8 | 5.7 | 5.86 | 5.86 | 5.86 | 4.8 | 4.8 |
| Speed of 3rd draw rolls [m/min] | 300 | 200 | 200 | 200 | 200 | 200 | 200 | 160 | 200 |
| Setting | | | | | | | | | |
| Setting temperature | 233 | 220 | 230 | — | — | — | 230 | 230 | 230 |
| Setting shrinkage | 0.84 | 0.89 | 0.94 | 0.995 | 0.995 | 0.995 | 0.995 | 0.87 | 0.91 |
| Yarn data | | | | | | | | | |
| Linear density [dtex] | 1129 | 1080 | 1080 | 1013 | 998 | 995 | 994 | 432 | 261 |
| Tenacity [cN/tex] | 68.4 | 72.1 | 75.5 | 76.8 | 78.9 | 81.4 | 82.8 | 69.1 | 66.0 |
| Breaking extension [%] | 24.7 | 18.7 | 18.7 | 9.0 | 8.3 | 8.4 | 8.5 | 20.3 | 14.6 |
| Extension at 54 cN/tex [%] | 21.2 | 15.4 | 9.5 | 5.8 | 5.9 | 6.0 | 5.7 | 15.4 | — |
| Dry heat shrinkage 200° C. [%] | 5.3 | 9.5 | 13.4 | 16.9 | 18.0 | 20.0 | 20.0 | 6.3 | 5.9 |
| Specific viscosity of yarn | 1.05 | 1.08 | 1.88 | 1.08 | 1.08 | 1.08 | 1.08 | 1.05 | 1.08 |
| Breaking energy index [% · cN/tex[ | 845 | 674 | 479 | 346 | 327 | 342 | 352 | 701 | 482 |

TABLE 2

| Conditions/feature | Comparative examples | | | | | |
|---|---|---|---|---|---|---|
| | Example 11 | Example 12 | Example 13 | Example 14 | Example 15 | Example 16 |
| Spinning | | | | | | |
| % by weight of compound of formuls I in polyester | 0 | 0 | 0 | 0 | 0 | 0 |
| Specific viscosity of chips | 1.15 | 1.15 | 1.15 | 1.15 | | |

TABLE 2-continued

Comparative examples

| Conditions/feature | Example 11 | Example 12 | Example 13 | Example 14 | Example 15 | Example 16 |
|---|---|---|---|---|---|---|
| Spinning temperature [°C.] | 300 | 300 | 300 | 300 | | |
| Spinning take-off speed [m/min] | 740 | 740 | 740 | 740 | | |
| Drawing | | | | | SPIN-DRAW PROCESSING | |
| Temperature of stage 1 [°C.] | 85 | 84 | 85 | 84 | | |
| Draw ratio of stage 1 | 3.32 | 3.42 | 3.30 | 3.42 | | |
| Temperature of stage 2 | 250 | 246 | 253 | 244 | | |
| Total draw ratio | 5.76 | 5.72 | 5.79 | 5.76 | | |
| Speed of 3rd draw rolls [m/min] | 300 | 300 | 300 | 300 | | |
| Setting | | | | | | |
| Setting temperature | 230 | 242 | 216 | 238 | | |
| Setting shrinkage | 0.912 | 0.898 | 0.954 | 0.877 | | |
| Yarn data | | | | | | |
| Linear density [dtex] | 1125 | 1125 | 1125 | 1125 | 1100 | 1100 |
| Tenacity [cN/tex] | 74.5 | 73.5 | 76 | 72 | 73.9 | 74.5 |
| Breaking extension [%] | 17.0 | 19.7 | 12.0 | 22 | 14.0 | 13.9 |
| Extension at 54 cN/tex [%] | 12.3 | 14.6 | 7.8 | 17 | 8.0 | 8.4 |
| Dry heat shrinkage 200° C. [%] | 4.9 | 3.5 | 8.5 | 2.5 | 16.8 | 22 |
| Specific viscosity of yarn | 1.05 | 1.05 | 1.05 | 1.05 | 1.05 | 1.09 |
| Breaking energy index [% · cN/tex] | 629 | 719 | 458 | 792 | 517 | 518 |

To test the flammability of the low flammability multifilament yarn of the present invention, an 1,100 dtex 200 filament 60 Z yarn according to the present invention was woven up into a plain weave with 8.5 ends per cm and 8.8 picks per cm.

For comparison, a woven fabric of the same structure was produced from non-modified commercial high tenacity polyethylene terephthalate yarn ((R) TREVIRA HIGH TENACITY) of the same linear density, filament count and twist level.

Both fabrics were then initially subjected in the loom state to the flammability tests of DIN 4102, DIN 54336 and DIN 54333 and also NF P 92-503.

The results of the comparative tests are shown in Table 3.

Parts of the comparative fabrics were coated with 600 g/m$^2$ of plasticized PVC containing 13% by weight of $Sb_2O_3$ as flame redardant, and subjected to the same flammability tests. The results of these tests are given in Table 4.

TABLE 3

| Flammability tests on loomstate fabric | Fabrics according to invention | TREVIRA HIGH TENACITY |
|---|---|---|
| DIN 4102 B2 test | | |
| Time to 150 mm mark [s] | no | <20 |
| Total burn time [s] | 2.3 | 30.0 |
| B1 test | | |
| Residual length [mm] | 71 | 70 |
| Maximum smoke temperature [°C.] | 112 | 109 |
| Maximum smoke temperature attained after [s] | 174 | 102 |
| Minimum light transmission | 25 | 30 |

TABLE 3-continued

| Flammability tests on loomstate fabric | Fabrics according to invention | TREVIRA HIGH TENACITY |
|---|---|---|
| [%] | | |
| Minimum light transmission attained after [s] | 47 | 84 |
| DIN 54336 3 second flaming | | |
| Total burn time [s] | 3 | 26.5 |
| Afterburn time [s] | 0 | 23.5 |
| Burn length [mm] | 52 | 166 |
| 15 second flaming | | |
| Total burn time [s] | 6.4 | 11.3 |
| Afterburn time [s] | 0 | 0 |
| Burn length [mm] | 130 | 129 |
| DIN 54333 | | |
| Total burn time [s] | 2.4 | 13.5 |
| Afterburn time [s] | 0 | 3.0 |
| Burn length [mm] | 9 | 26 |
| NF P 92-503 | M 1 | M 3 |

TABLE 4

| Flammability tests on coated fabric | Fabrics according to invention | TREVIRA HIGH TENACITY |
|---|---|---|
| DIN 4102 B2 test | | |
| Time to 150 mm mark [s] | >20 | <20 |
| Total burn time [s] | 26.8 | 121.0 |

TABLE 4-continued

| Flammability tests on coated fabric | Fabrics according to invention | TREVIRA HIGH TENACITY |
|---|---|---|
| B1 test | | |
| Residual length [mm] | 51 | 7 |
| Maximum smoke temperature [°C.] | 118 | 165 |
| Maximum smoke temperature attained after [s] | 36 | 41 |
| Minimum light transmission [%] | 42 | 0 |
| Minimum light transmission attained after [s] | 47 | 50 |
| DIN 54336 | | |
| 3 second flaming | | |
| Total burn time [s] | 3 | 3.2 |
| Afterburn time [s] | 0 | 0.2 |
| Burn length [mm] | 8 | 6 |
| 15 second flaming | | |
| Total burn time [s] | 71.3 | 161.3 |
| Afterburn time [s] | 56.3 | 141.3 |
| Burn length [mm] | 230 | 339 |
| DIN 54333 | | |
| Total burn time [s] | 15.6 | 17.8 |
| Afterburn time [s] | 1.3 | 4.4 |
| Burn length [mm] | 12 | 13.5 |
| NF P 92-503 | M 1 | M 3 |

What is claimed is:

1. A low flammability multifilament yarn, said multifilament comprising a polyester formed from dicarboxylic acid and diol components which contains, in the polymer chain, units of the formula I

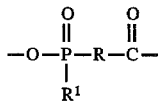

where

R is a saturated open-chain or cyclic alkylene, arylene or aralkylene radical, and $R^1$ is an alkyl radical of up to 6 carbon atoms or an aryl or aralkyl radical, wherein the yarn has a tenacity of at least 65 cN/tex, a total burn time, when made into a loomstate cloth and subjected to the flammability test of DIN 4102/B2, which is at least 5 times shorter than that of a comparable loomstate cloth composed of non-phosphorus-modified polyester, and wherein the yarn has no afterburning on 3 and 15 sec flaming according to DIN 54336 and 3 sec flaming according to DIN 54333.

2. The multifilament yarn of claim 1, wherein the polyester contains units of the formula I where R is open-chain alkanediyl having from 1 to 15 carbon atoms with one or two fused or unfused nuclei, cyclic alkanediyl having from 4 to 8 carbon atoms with one or two fused or unfused nuclei, arylene having from 6 to 12 carbon atoms with one or two fused or unfused nuclei or aralkyl having from 7 to 13 carbon atoms with one or two fused or unfused nuclei, and $R^1$ is alkyl having from 1 to 6 carbon atoms with one or two fused or unfused nuclei, arylene having from 6 to 12 carbon atoms with one or two fused or unfused nuclei or aralkyl having from 7 to 13 carbon atoms with one or two fused or unfused nuclei.

3. A multifilament yarn as claimed in claim 2, wherein the polyester contains units of the formula I where R is an open-chain alkanediyl having from 2 to 10 carbon atoms, cyclic alkanediyl having 6 carbon atoms, arylene having from 6 to 10 carbon atoms, or aralkyl having from 7 to 11 carbon atoms, and $R^1$ is alkyl having 1 to 4 carbon atoms, arylene having from 6 to 10 carbon atoms, or aralkyl having from 7 to 11 carbon atoms.

4. The multifilament yarn of claim 1, wherein the yarn has a tenacity of above 65 cN/tex and a dry heat shrinkage $S_{200}$ of below 7.5%.

5. The multifilament yarn of claim 1, wherein the yarn has a tenacity of above 70 cN/tex and a dry heat shrinkage $S_{200}$ of below 15%.

6. The multifilament yarn of claim 1, wherein the yarn has a tenacity of above 75 cN/tex and a dry heat shrinkage $S_{200}$ of above 15%.

7. The multifilament yarn of claim 1, wherein the relationship between the tenacity F of the yarn and its dry heat shrinkage $S_{200}$, in %, is given by equation (1)

$$F\ [\{CN/tex\}] = K + 0.954[\{CN/(tex\ \%)\}] * S_{200}\ [\{\%\}] \qquad (1)$$

where the summand K is above 55 and $S_{200}$ is from 2 to 25%.

8. A multifilament yarn as claimed in claim 7, wherein the summand K is from 60 to 67, and $S_{200}$ is from 4 to 22%.

9. The multifilament yarn of claim 1, having a breaking extension of from 5 to 30% and a breaking energy index $A_R = F \cdot E/2$ of from 300 to 900% cN/tex.

10. A multifilament yarn as claimed in claim 9, wherein the breaking extension is from 7.5 to 26%.

11. The multifilament yarn of claim 1, wherein, in the formula I, $R^1$ is alkanediyl having from 2 to 6 carbon atoms or phenylene and $R^2$ is alkyl having from 1 to 6 carbon atoms, or aryl or aralkyl having from 6 to 7 carbon atoms.

12. A multifilament yarn as claimed in claim 11, wherein $R^1$ is ethylene, and $R^2$ is methyl, ethyl, phenyl, or benzyl.

13. The multifilament yarn of claim 1, wherein at least 90 mol % of the units making up the polyester are ethylene terephthalate groups.

14. A low flammability multifilament yarn as claimed in claim 1, wherein when made into a loom state cloth and subjected to the flammability test of DIN 4102/B2, has a flammability of at least 10 times shorter than that of the comparable loom state cloth composed of non-phosphorus modified polyester.

15. The multifilament yarn of claim 1, wherein the polymer chains of the polyester, based on the total sum of all their dicarboxylic acid and diol components, contain from 0.5 to 14 mol % of units of the formula I; from 40 to 49.75 mol % of units of the formula II

from 6 to 0 mol % of units of the formula III

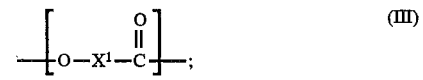

and from 40 to 49.75 mol % of groups of the formula IV $$+O-Y+ \quad \text{(IV)}$$

where

X comprises at least 80 mol %, based on the totality of the radicals X=100 mol % of monocyclic or bicyclic aromatic radicals having from 6 to 12 carbon atoms; and, not more than 20 mol % of monocyclic or polycyclic aromatic radicals having 5 to 16 carbon atoms, araliphatic radicals having one or two aromatic nuclei and from 1 to 6 carbon atoms or aliphatic radicals having from 4 to 10 carbon atoms, $X^1$ denotes monocyclic or polycyclic aromatic radicals having from 5 to 16 carbon atoms, araliphatic radicals having one or two aromatic nuclei and from 1 to 6 carbon atoms or aliphatic radicals having from 4 to 10 carbon atoms, Y comprises at least 80 mol %, based on the totality of the radicals Y=100 mol % of alkylene or polymethylene groups having from 2 to 4 carbon atoms or cycloalkane or bismethylenecycloalkane groups having 6 to 10 carbon atoms and not more than 20 mol % of straight-chain or branched alkanediyl having from 5 to 16 carbon atoms, cycloalkane or bismethylenecycloalkane groups having from 6 to 10 carbon atoms or radicals of the formula —$(CH_2CHR^3$—$O)_n$—$CH_2CHR^3$—, where $R^3$ is methyl or hydrogen and n is an integer from 1 to 40.

16. The multifilament yarn of claim 15, wherein the polyester consists essentially of groups of the formula II in which from 90 to 100 mole % of the radicals X are p-phenylene and from 0 to 10 mol % of the radicals X are m-phenylene, 5-sulfo-1,3-phenylene; 5-sulfopropoxy-1,3-phenylene; 2,6-naphthylene; 4,4'-biphenylene; 1,4-bismethylenephenyl, 1,4-cyclohexanediyl, 1,2-cyclobutanediyl, 1,4-n-butanediyl, 1,5-n-pentanediyl or radicals of the formula V

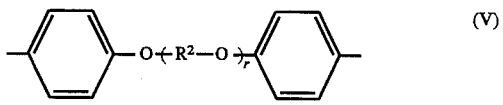

where $R^2$ is straight-chain or branched alkanediyl having from 2 to 6 carbon atoms and r is 0 or 1.

17. A multifilament yarn as claimed in claim 16, wherein the polyester consists essentially of groups of the formula II in which from 95 to 100 mol % of the radicals X are p-phenylene and from 0 to 5 mol % of the radicals X are a) m-phenylene,
b) 5-sulfo-1,3-phenylene,
c) sulfopropoxy-1,3-phenylene,
d) 2,6-naphthylene,
e) 4,4'-biphenylene,
f) 1,4-bismethylenephenyl,
g) 1,4-cyclohexanediyl,
h) 1,2-cyclobutanediyl,
i) 1,4-n-butanediyl,
j) 1,5-n-pentanediyl or
k) radicals of the formula V where $R^2$ is straight-chain or branched alkanediyl having from 2 to 6 carbon atoms and r is 0 or 1.

18. A multifilament yarn as claimed in claim 15, wherein the polymer chains of the polyester contain 1.0 to 10 mol % of units of formula I, from 43.5 to 49.5 mol % of units of the formula II, from 3 to 0 mol % of units of the formula III, and from 43 to 49.5 mol % of groups of the formula IV.

19. A multifilament yarn as claimed in claim 15, wherein X comprises at least 80 mol % of phenylene radicals; and, not more than 20 mol % of monocyclic or polycyclic aromatic radicals having from 6 to 18 carbon atoms or aliphatic radicals having from 6 to 8 carbon atoms, wherein $X^1$ denotes monocyclic or polycyclic aromatic radicals having from 6 to 12 carbon atoms, or aliphatic radicals having from 6 to 8 carbon atoms, and Y contains not more than 20 mol % of straight-chain or branched alkanediyl having from 5 to 8 carbon atoms.

20. A multifilament yarn as claimed in claim 15, wherein said radicals of the formula —$(CH_2CHR^3$—$O)_n$—$CH_2CHR^3$— are present in amounts up to 15 mol % and n=1 or 2.

21. A multifilament yarn as claimed in claim 15, wherein said radicals of the formula —$(CH_2CHR^3$—$O)_n$—$CH_2CHR^3$— are present in amounts up to 5 mol % and n=10 to 40.

22. The multifilament yarn of claim 1, wherein the polyester comprise
A) at least 80 mol % of units derived from
i) monocyclic aromatic dicarboxylic acids or
ii) bicyclic aromatic dicarboxylic acids and from
a) alkanediols having 2 to 4 carbon atoms or
b) 1,4-dihydroxymethylcyclohexane, and
B) not more than 20 mol % of the formula I and one of the following groups
i) groups derived from aromatic dicarboxylic acids having one or more condensed or uncondensed aromatic nuclei or
ii) groups derived from araliphatic dicarboxylic acids having one or more condensed or uncondensed aromatic nuclei,
iii) groups derived from cyclic aliphatic dicarboxylic acids
iv) groups derived from acyclic aliphatic dicarboxylic acids
v) groups derived from branched diols having from 3 to 10 carbon atoms,
vi) groups derived from long-chain diols having from 3 to 10 carbon atoms,
vii) groups derived from branched and long-chain diols having from 3 to 10 carbon atoms,
viii) groups derived from cyclic diols.
ix) groups derived from diols containing ether groups,
x) groups derived from polyglycol having a molecular weight of about 500-2000 or
xi) mixtures of said groups i) to x) above.

23. The multifilament yarn of claim 1, wherein, in the polyester, from 80 to 100 mol % of the diol components are ethylene glycol and
from 0 to 20 mol % of the diol components are
a) 1,4-bis-methylenecyclohexane,
b) 2,2-dimethyl-1,3-propanediyl or
c) mixtures thereof, and
from 0 to 3 mol % of the diol components are long-chain diol units.

24. A high tenacity, low flammability building textile, comprising low flammability multifilament yarns as claimed in claim 1.

25. A tent formed from the low flammability multifilament yarns of claim 1.

26. A conveyor below formed from the low flammability multifilament yarns of claim 1.

27. A flame resistant coating substrate formed from the low flammability multifilament yarns of claim 1.

28. A fabric having flame resistant coating, formed from the low flammability multifilament yarns of claim 1.

29. A strength component in rubber products, comprising the low flammable multifilament yarns of claim 1.

30. A process for producing the low flammability multifilament yarn as claimed in claim 1, wherein said multifilament yarn is produced from a polyester formed from dicarboxylic acid and diol components which, in the polymer chain, contains groups of the formula I which comprises the steps of melting the polyester, filtering the melt, extruding the melt through a spinneret, cooling the spun filaments by quenching with air, followed by take-off, drawing and setting, taking off the filaments at a spinning take-off speed of above 300 m/min, drawing the filaments continuously or batchwise in at least two stages, the pre-draw, which accounts for from 50 to 70% of the total draw, being carried out at a temperature between 70° and 85° C. and the second drawing stage, which is carried out at a temperature of from 215° to 235° C., being used to set a total draw ratio of from 1:4.5 to 1:6, and subjecting the drawn filaments optionally to a setting and relaxing treatment at temperatures of from 225° to 240° C. using a shrinkage ratio of from 1:1 to 1:0.8.

31. The process of claim 30, wherein the draw ratio of the first drawing stage ranges from 1:2.4 to 1:3.4.

* * * * *